US010149326B2

(12) United States Patent
Sun et al.

(10) Patent No.: US 10,149,326 B2
(45) **Date of Patent: *Dec. 4, 2018**

(54) APPARATUS FOR DATA TRANSMISSION METHOD

(71) Applicant: MediaTek Singapore Pte. Ltd., Singapore (SG)

(72) Inventors: Feifei Sun, Beijing (CN); Yuanyuan Zhang, Beijing (CN); Chia-Chun Hsu, New Taipei (TW); I-Kang Fu, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,219

(22) Filed: Aug. 25, 2017

(65) Prior Publication Data

US 2018/0007717 A1 Jan. 4, 2018

Related U.S. Application Data

(63) Continuation of application No. 14/434,248, filed as application No. PCT/CN2013/084848 on Oct. 8, 2013, now Pat. No. 9,807,800.

(30) Foreign Application Priority Data

Oct. 8, 2012 (CN) .......................... 2012 1 0376990

(51) Int. Cl.

*H04W 74/08* (2009.01)
*H04W 72/04* (2009.01)
*H04W 72/14* (2009.01)

(52) U.S. Cl.

CPC ... *H04W 74/0833* (2013.01); *H04W 72/0413* (2013.01); *H04W 72/14* (2013.01)

(58) Field of Classification Search

CPC ................................................ H04W 74/0833
See application file for complete search history.

(56) References Cited

U.S. PATENT DOCUMENTS 8,027,356 B2 * 9/2011 Lee .................. H04W 74/0833
370/445
8,077,670 B2 * 12/2011 Fan .................. H04W 72/0453
370/330

(Continued)

FOREIGN PATENT DOCUMENTS

| CN | 102149174 A | 8/2011 |
|---|---|---|
| CN | 102149198 A | 8/2011 |
| WO | 2011/122834 A2 | 10/2011 |

*Primary Examiner* — Andrew Lai
*Assistant Examiner* — Andrew C Lee
(74) *Attorney, Agent, or Firm* — McClure, Qualey & Rodack, LLP

(57) ABSTRACT

This invention proposes efficient data transmission methods in the mobile cellular network. A specific resource pool is divided into several resource groups to indicate the size level of the data available for transmission. The base station allocates a proper UL grant to the terminal. Based on the allocated UL grant, the terminal compares the granted Transport Block (TB) size with the size of data available for transmission. If the UL grant is large enough, the terminal transmits the data available for transmission in the allocated UL resource, otherwise, re-attempts the random access procedure. In another example, the terminal transmits a BSR message and as much of the data as is available for transmission. The base station may grant additional UL resources if there is remaining data to be transmitted. A timer is used for the terminal to decide whether waiting for the additional UL grant from the base station.

19 Claims, 12 Drawing Sheets

(56) References Cited

U.S. PATENT DOCUMENTS 9,510,300 B2* 11/2016 Ahn .................... H04W 52/146
2009/0080380 A1* 3/2009 Chun .................... H04W 28/06 370/329
2009/0109912 A1* 4/2009 DiGirolamo .......... H04L 5/0053 370/329
2009/0143074 A1* 6/2009 Pelletier ............ H04W 72/1284 455/452.2
2009/0201798 A1* 8/2009 Lee .................... H04W 74/002 370/216
2009/0201873 A1 8/2009 Korhonen et al.
2009/0201973 A1* 8/2009 Cranford, Jr. .......... H04B 1/707 375/130
2009/0238366 A1* 9/2009 Park .................... H04W 74/002 380/270
2010/0074203 A1* 3/2010 Pani ...................... H04W 60/02 370/329
2010/0195579 A1* 8/2010 Park .................... H04W 74/006 370/329
2010/0296467 A1* 11/2010 Pelletier .............. H04W 74/002 370/329
2010/0331003 A1* 12/2010 Park .................. H04W 74/0833 455/450
2011/0045837 A1* 2/2011 Kim .................. H04W 74/0833 455/452.1
2011/0274040 A1* 11/2011 Pani ........................ H04W 4/70 370/328
2012/0115460 A1* 5/2012 Lin ................... H04W 36/0083 455/423
2012/0163296 A1 6/2012 Cheon et al.
2012/0269137 A1* 10/2012 Kang ................... H04B 7/0404 370/329
2012/0300715 A1* 11/2012 Pelletier ............ H04W 56/0005 370/329
2013/0010722 A1* 1/2013 Suzuki .................. H04L 1/1854 370/329
2013/0021979 A1* 1/2013 Kwon ............... H04W 56/0045 370/328
2013/0028219 A1* 1/2013 Lee ....................... H04L 5/0053 370/329
2013/0102320 A1* 4/2013 Suzuki ................ H04W 72/042 455/452.1
2013/0322413 A1* 12/2013 Pelletier ............ H04W 72/1289 370/336
2015/0110038 A1* 4/2015 Yang ................... H04W 72/042 370/329
2015/0156764 A1* 6/2015 Yang ..................... H04L 1/0076 370/329

* cited by examiner

APPARATUS FOR DATA TRANSMISSION METHOD

CROSS REFERENCE TO RELATED APPLICATIONS

This application is a Continuation of application Ser. No. 14/434,248, filed on Apr. 8, 2015 (now U.S. Pat. No. 9,807,800 B2), which is a National Stage Application of PCT Application Ser. No. PCT/CN2013/084848, filed on Oct. 8, 2013, which claims priority of China Patent Application No 201210376990.X, filed Oct. 8, 2012. The entirety of which is incorporated by reference herein.

TECHNICAL FIELD

This disclosure relates generally to data transmission method and, more particularly, to the effective data transmission method of a mobile cellular network of machine type communication (MTC).

BACKGROUND

Due to the development of wireless MTC technology, the number of cellular MTC subscribers has increased significantly during the past several years. This machine-type communication brings in some new features and requirements for air-interface optimization. The 3rd generation partnership project (3GPP) has both structure analysis (SA) and radio access network (RAN) working groups working on these new features for optimizations. Some common features have been figured out in 3GPP TR 23.888 by SA2, such as small-data transmission, lower-power consumption, time-controlled traffic, infrequent traffic and so on. RAN 2 has studied RAN improvements for MTC and RAN1 is studying low-cost MTC terminals based on LTE.

FIG. 1A shows the contention based random access procedure. FIG. 1B shows a diagram of a MAC random access response message. In 3GPP TS 36.300, four steps of the contention based random access procedures are described, which is performed when a UE initially accesses the network. UE selects a random access preamble based on eNB's configuration through system information and transmits this preamble on a time and frequency resource. Random Access Response (Msg2) conveys at least the RA-preamble identifier, Timing Advance command, initial UL grant and assignment of Temporary C-RNTI, as shown in FIG. 1A. The UE sends the scheduled transmission (Msg3) through the initial UL grant (as shown in FIG. 1B) conveyed in Msg2. For initial access, Msg3 conveys the RRC Connection Request generated by the RRC layer and at least the NAS UE identifier. Msg4 conveys contention resolution. HARQ feedback is transmitted only by the UE which detects its own UE identification, as provided in message 3, echoed in the Contention Resolution message.

Compared with the data package size, the signaling overhead (PDCCH/MAC CE/RRC message) is relatively large. Finding methods of more efficiently transmitting the small data with less overhead is an important issue.

SUMMARY OF THE INVENTION

Therefore, effective data-transmission methods for a mobile cellular network are provided.

In one novel aspect, An user equipment is provided, comprising: a RF transceiver that receives broadcast information from a base station, wherein the broadcast information comprises at least one specific resource pool and at least one non-specific resource pool for a random access preamble; and a processor that utilizes the at least one specific resource pool to perform a random access (RA) procedure of data transmission when the user equipment meets at least one condition, and generates a media access control (MAC) package data unit (PDU) in message 3 (MSG 3) in the allocated UL resource, wherein the MAC PDU comprises data available for transmission from an application layer; the RF transceiver is further configured to receive random access response (RAR) from the base station, wherein the RAR comprises allocated uplink (UL) resource; and the RF transceiver transmits the MAC PDU in MSG 3 in the allocated UL resource to the base station.

In one novel aspect, an effective data-transmission method is provided, including receiving broadcast information from a base station by a terminal, wherein the broadcast information comprises at least one specific resource pool and at least one non-specific resource pool; and utilizing the at least one specific resource pool to perform a random access procedure of data transmission by the terminal when the terminal meets at least one condition.

In one novel aspect, some resource pools are for the terminal to perform a random access procedure for RRC connection (Re-)establishment procedure, and the other specific resource pools are for transmitting traffic data without establishing an RRC connection. The resource pools may be separated by different preamble sequences sets, or different composite time-frequency region sets, or different combinations of preamble sequences and composite time-frequency regions. The data available for transmission at least comprises the terminal identification information, the routing information in the core network and the traffic data package from the application layer.

In the second novel aspect, at least one condition may be configured by the base station or pre-defined in the specification to support the traffic data transmission without establishing an RRC connection. The at least one condition can be one or a combination of the following conditions: the traffic data package from application layer that needs to be transmitted is bigger than zero; the size of data available for transmission in the terminal is smaller than a threshold; the channel condition is better than a threshold; the delay requirement is less than a threshold; the expected data-arrival interval is larger than a threshold.

As the effective data transmission method described above, the terminal further determines whether it can meet the condition(s) for the traffic data transmission without establishing an RRC connection. If the terminal meets the condition(s), the terminal may select a resource from the specific resource pool(s) for non-RRC connection based data transmission. If the terminal cannot meet the condition(s), the terminal may establish an RRC connection and then transmit traffic data later.

In the third novel aspect, some resources pools are used by the terminal to inform the base station of some information or feature of the terminal, such as the channel condition (path-loss/coverage), the traffic data packet size, the expected data-arrival interval and the delay requirement. With this early knowledge, the base station can give a proper response, such as allocating a UL grant considering the traffic data size, using a proper resource to transmit the UL grant to the terminal. The UL grant is based on the channel condition provided by the terminal.

In the fifth novel aspect, a terminal detection equipment is provided, comprising: transmitting by a terminal a preamble sequence to the base station over a time-frequency region, wherein the preamble sequence and/or the time-frequency region is/are selected from a resource group in a specific resource pool.

In the sixth novel aspect, the terminal calculates a channel condition, compares the channel condition to a threshold, and selects the resource group from the specific resource pool according to the channel condition and a pre-defined mapping rule.

In the seventh novel aspect, the terminal calculates the size of data available for transmission, matches the calculated value to a size level, and selects a resource from a resource group in the specific resource according to the pre-defined mapping rule. The data available for transmission at least comprises the information to identify the terminal, information on how to route to the serving gateway and a traffic data package from the application layer. For example, the routing information relates to the end point of the PDN connection or the bearer of SGW, such as bearing the resource ID. The above information can be provided by the base station to the terminal. Or the routing information may include the connection ID, the token and the signature. The mapping between the connection ID and the contexts of the terminal, and the mapping between SGWs can be stored on the base station.

In the eighth novel aspect, the terminal calculates the size of data available for transmission and matches the calculated value to a size level. If the calculated size or the matched size level is larger than a threshold, the terminal may establish the RRC Connection and transmit traffic data.

In the ninth novel aspect, the base station receives the preamble sequence over a time-frequency region from the terminal, obtains the size level of data available for transmission from the terminal, allocates an uplink (UL) grant based on this size level for the terminal, and transmits on the random access response. After the terminal receives and decodes the random access response, the terminal determines whether the Transport Block (TB) size that was granted is equal to or larger than the size of available data for transmission. If the TB size that was granted is equal to or larger than the size of available data to transmit, the terminal shall transmit all the data available for transmission in the allocated UL resource. If the TB size that was granted is equal to larger than the size of available data to transmit, the terminal shall multiplex several MAC Service Data Units (SDUs) in a MAC Package Data Unit (PDU) which contain the data available for transmission The terminal stores the MAC PDU in the Msg3 buffer, and transmits the Msg3 in the allocated UL resource. If the TB size granted is smaller than the size of available data to transmit, a Buffer Status Report (BSR) may be triggered; the terminal multiplexes the terminal identification information, the routing information in the core network, the BSR MAC Control Element and the traffic data package from application layer with a strict decreasing priority order until the UL grant is exhausted. The terminal stores the MAC PDU in Msg3 and transmits the Msg3 in the allocated UL resource. If the TB size granted is smaller than the size of available data to transmit, the terminal may re-attempt the random access procedure.

In another novel aspect, after the base station resolves the contention resolution for the terminal, the base station grants an additional UL resource to the terminal for the remaining data, wherein the UL grant may be based on the received BSR from the terminal. The remaining data can be the rest of data when the UL grant is exhausted for a MAC PDU with a strict decreasing priority order of the terminal identification information, the routing information in the core network, the BSR MAC Control Element and the traffic data package from application layer. Alternatively, after the terminal successfully finishes the contention resolution, if the terminal receives an additional UL grant, the terminal transmits the remaining data with the UL resource. If there is remaining data in the terminal but there is no additional UL grant received from the base station in an additional UL grant Timer, the terminal may re-attempt the random access procedure. After successfully decoding the remaining data transmitted from the terminal, the base station may transmit an Ack message to the terminal, combine the remaining data after the previous received data, and transmit the traffic data package to the proper server through a serving gateway.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4A-1, 4A-2 4B-1, 4B-2, 4C-1, 4D-1 and 4D-2 illustrate data transmission methods in accordance with the embodiments of the present invention.

DETAILED DESCRIPTION

Certain terms and figures are used throughout the description and following claims to refer to particular components. As one skilled in the art will appreciate, manufacturers may refer to a component by different names. This document does not intend to distinguish between components that differ in name but not function. The terms of "component", "system" and device used on the present invention could be the entity relating to the computer which is a hardware, a software, or a combination of the hardware and the software. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
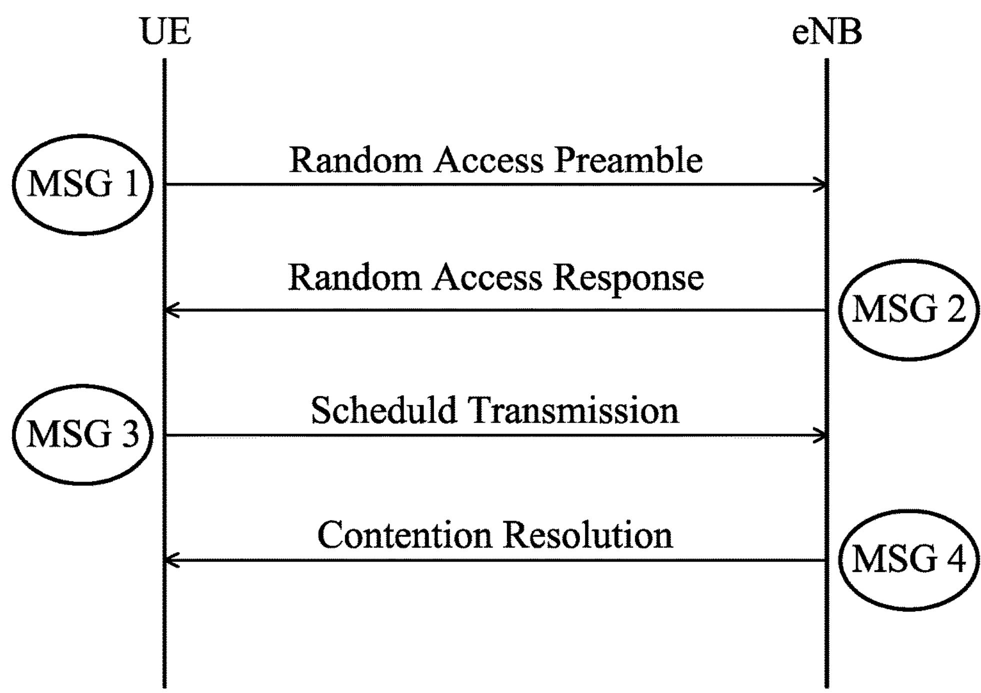
FIG. 1A illustrates a random access procedure of the prior art.
Figure 1B:
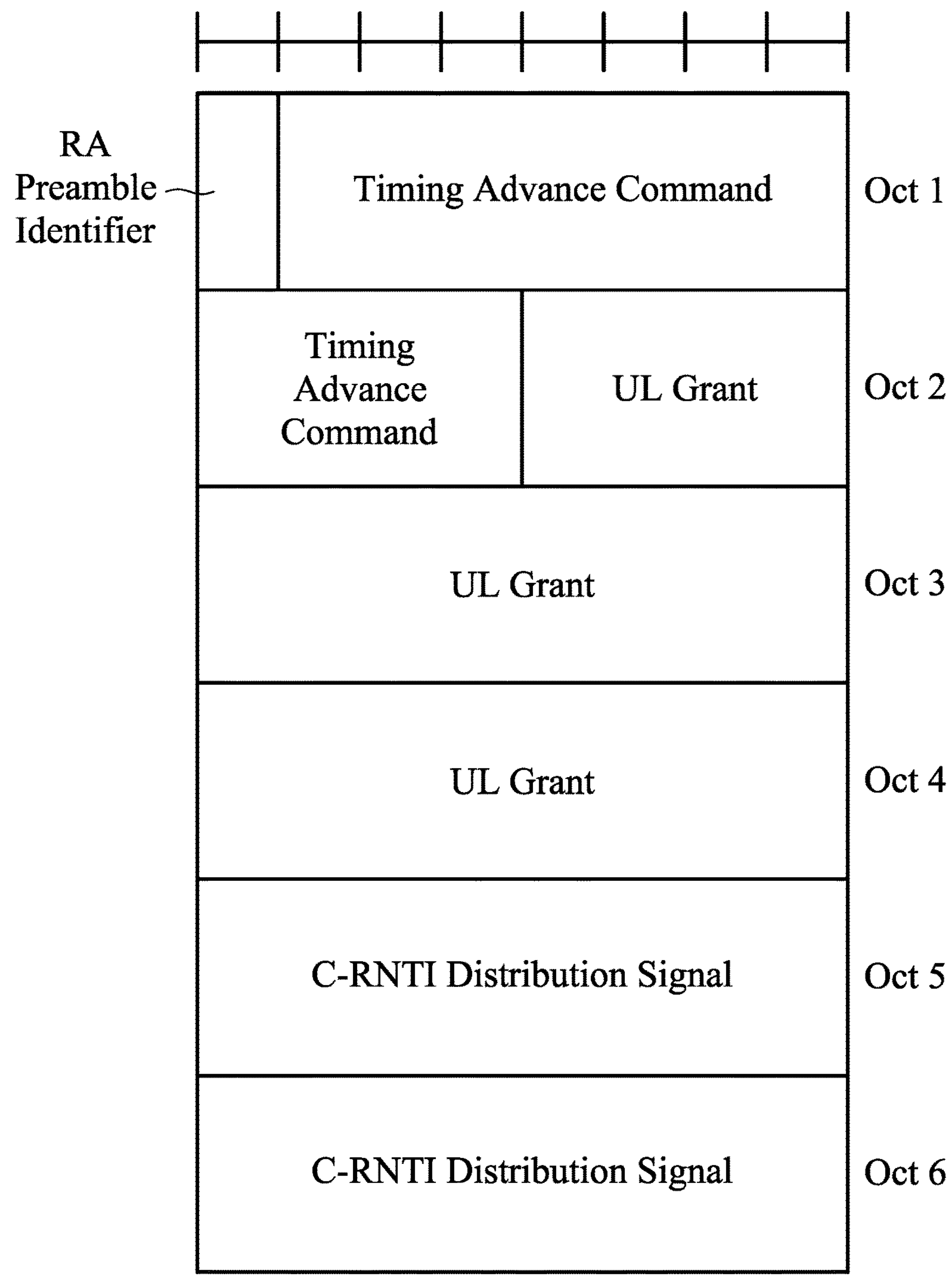
FIG. 1B illustrates a MAC random access response.
Figure 2:
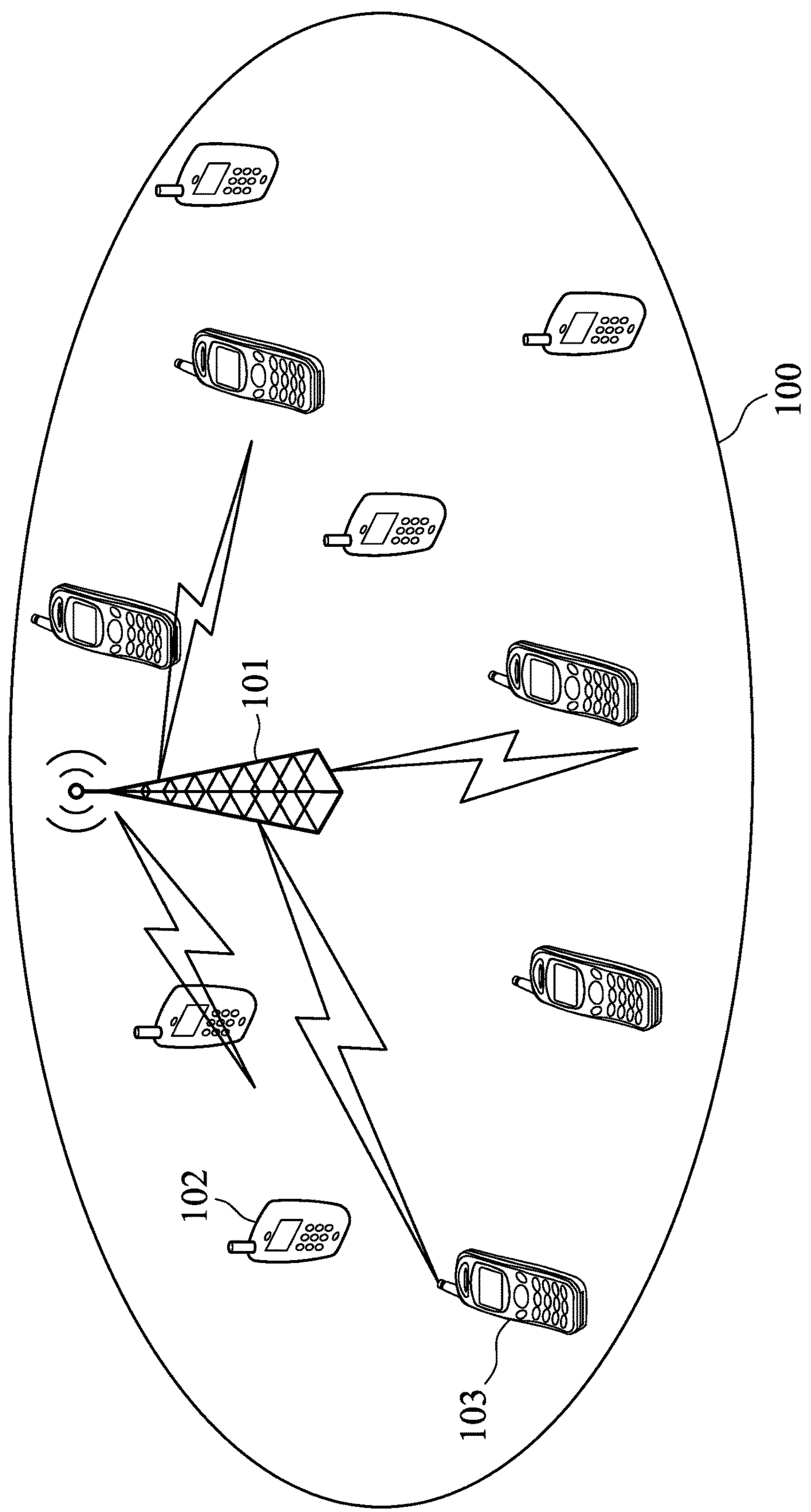
FIG. 2 illustrates a wireless communication system in accordance with the embodiments of the present invention.

FIG. 2 illustrates a wireless communication system 100 in accordance with a embodiment of the present invention. The wireless communication system 100 includes a base station 101 serving different types of terminals 102 and 103. Different types of terminals, e.g., terminal A 102 and terminal B 103 may have different types of traffic, e.g. big or small data traffic, or may be a human-to-human (H2H) device or a machine type communications (MTC) device. Different types of terminal are served within the same geographic region or cell by the same base station(s). The disclosure, however, is not intended to be limited to any particular wireless communication system.

Figure 3:
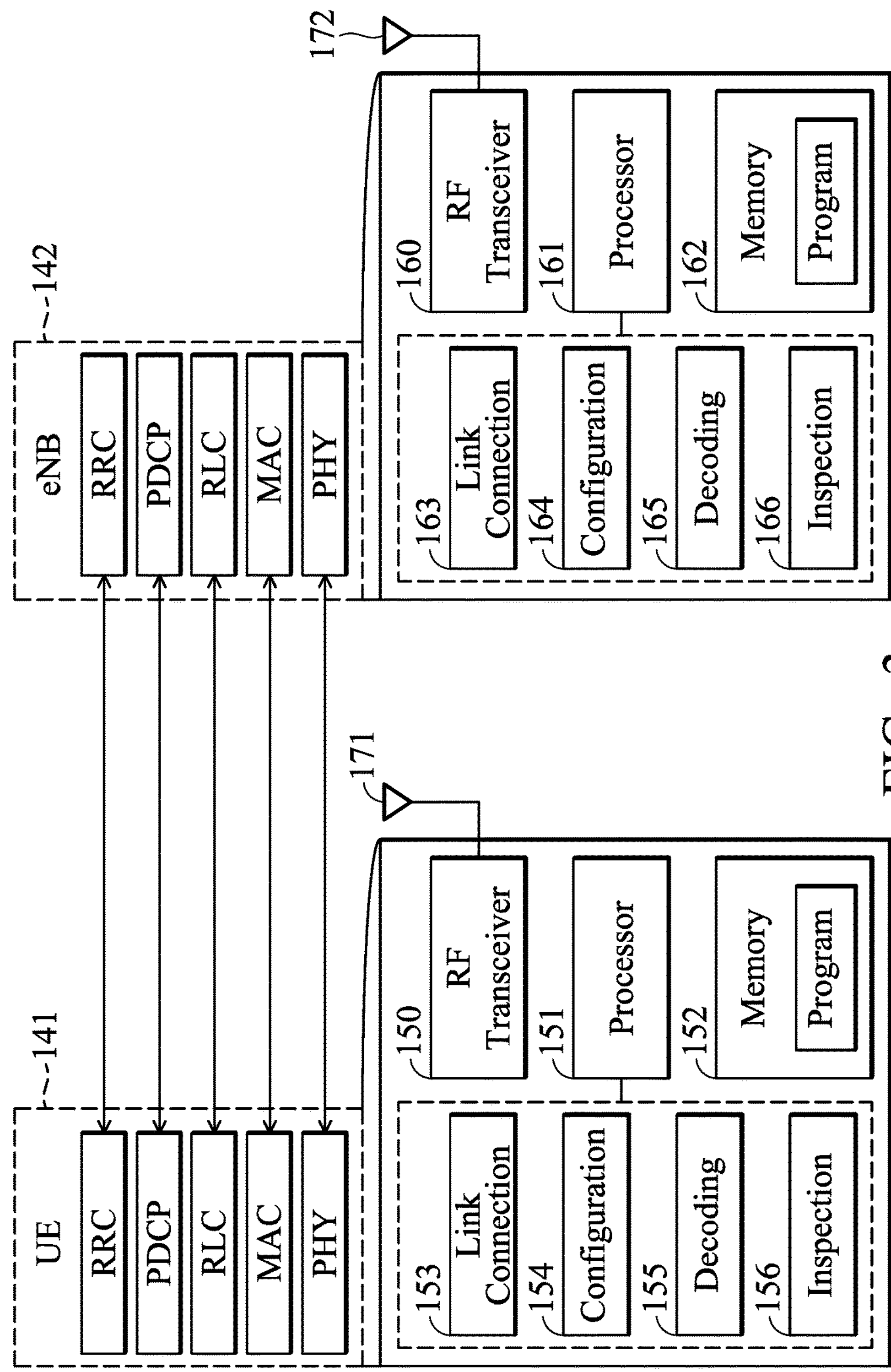
FIG. 3 illustrates the protocol stacks and a portion of functional modules of UE and eNB in accordance with the embodiments of the present invention.

FIG. 3 briefly illustrates the protocol stacks of the UE 141 and the eNB 142 in accordance with the embodiments of the present invention. The UE 141 includes the physical layer stack (PHY) module, the MAC layer (MAC) module, the radio link control (RLC) module, the packet data control protocol (PDCP) module and the radio resource control (RRC) module. The eNB 142 has the corresponding protocol stacks as the UE 141 including PHY, MAC, RLC, PDCP and RRC.

The UE 141 and the RF transceiver 150 are coupled to the antenna 171, and the RF transceiver 150 receives the RF signals from the antenna 171, converts the RF signals into the baseband signals and transmits them to the processor 151. The RF transceiver 150 converts the baseband signals received from the processor 151 into the RF signals and transmits them to the antenna 171. The processor 151 processes the received baseband signals and activates different functional modules to implement the functions of the UE 141. The memory 152 stores program instructions and data to control the operation of the UE 141. FIG. 3 further points out the diagrams of the four functional modules 153 to 156 to perform the embodiments of the present invention. The link connection module 153 connects with several points or several eNBs to support the data transmission. The configuration module 154 is utilized to store configurations relating to the specific resource pool. The decoding module 155 decodes the received data streams. The inspection module 156 inspects whether the UE meets at least one pre-determined condition or not.

The eNB 142 has the RF transceiver 160. The RF transceiver 160 is coupled to the antenna 172 to receive the RF signals from the antenna 172, convert the RF signals into the baseband signals and transmit them to the processor 161. The RF transceiver 160 also converts the baseband signals received from the processor 161 into the RF signal and transmits to the antenna 172. The processor 161 processes the received baseband signals and activates different functional modules to implement the functions of the eNB 142. The memory 162 stores program instructions and data to control the operation of the eNB 142. FIG. 3 further points out the diagrams of the four functional modules 163 to 167 of the eNB 142 to perform the embodiments of the present invention. The link connection module 163 manages the connections between eNBs and the connections between the UE and the eNB. The configuration module 164 is utilized to store configurations for allocating the resource pools and relating information for configuring the resource pool. The decoding module 166 decodes the data for transmission. The inspection module 167 inspects whether the UE meets at least one pre-determined condition or not, and determines the following operations such as providing the UL grant for utilizing the specific resource pool.

Figures 1, 4A:
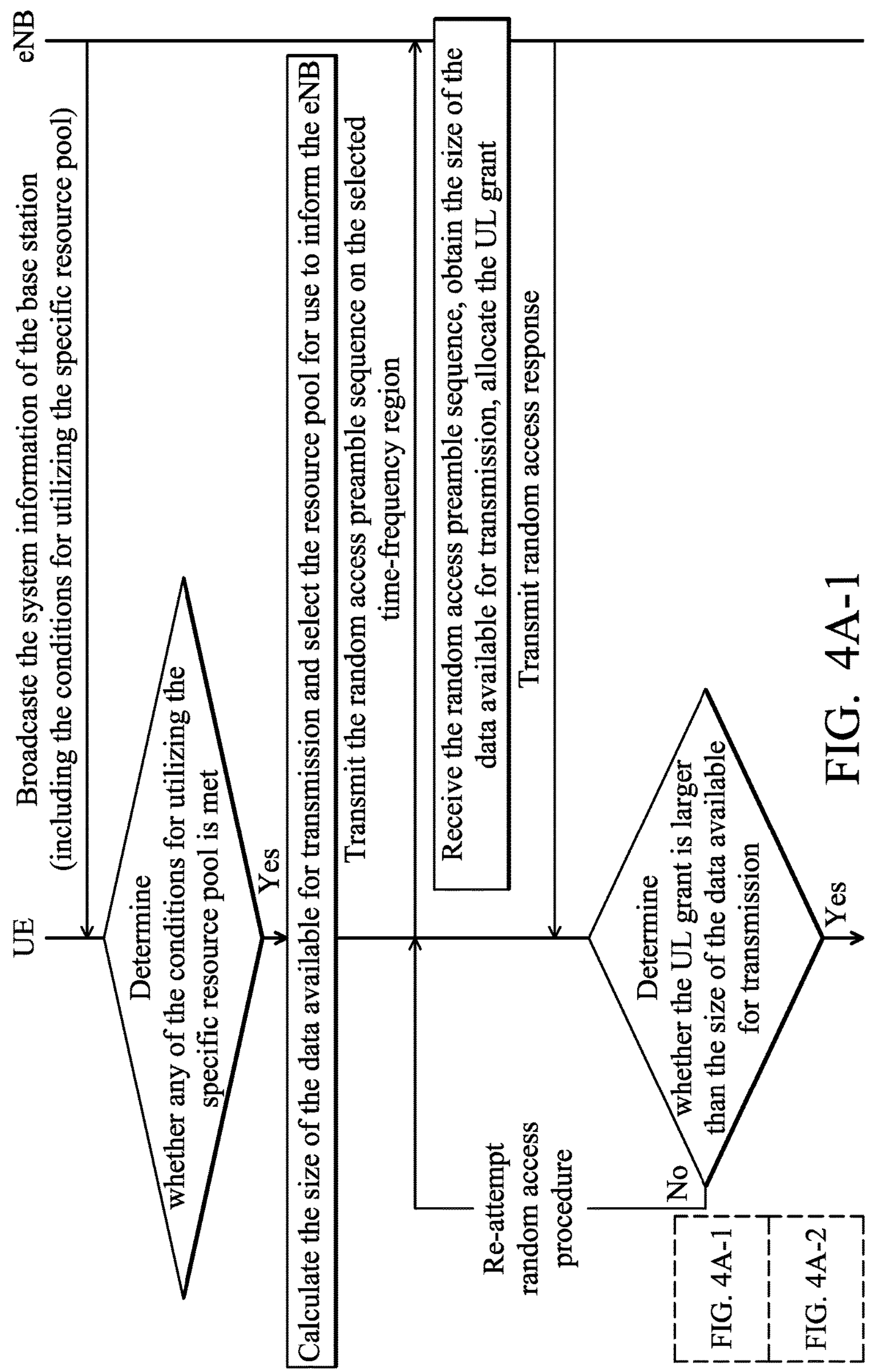
Figures 2, 4A:
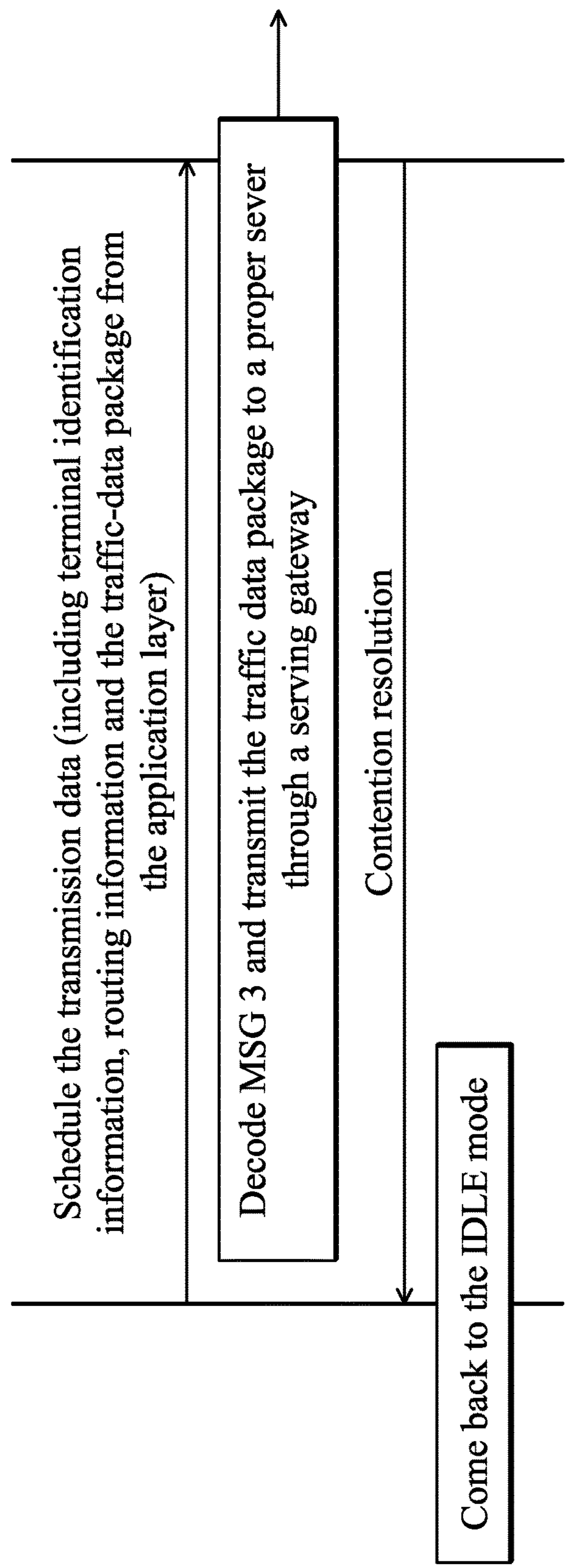

FIGS. 4A, 4B, 4C and 4D illustrate data transmission methods in accordance with the embodiments of the present invention. As shown in FIG. 4A, the base station may broadcast system information (SI) that includes configurations about random access and other channel information to the terminals. In the configurations, there may be several separate resource pools, which may be separated through different preamble sequences sets, or through different composite time-frequency region sets, or through different combinations of preamble sequences and composite time-frequency regions. Some resource pools are for the terminal to perform a random access procedure for RRC Connection (Re-)establishment and the other special resource pool(s) is/are for the terminal to perform a random access procedure and transmit data without RRC Connection (Re-)establishment.

In one embodiment, some resources pools are used by the terminal to inform the base station about some information or feature of the terminal, such as the channel condition (path-loss/coverage), the size of traffic data packet, the expected data-arrival interval and the delay requirement. With this early knowledge, the base station can give a proper response such as allocating a UL grant considering the traffic data size, and use a proper resource to transmit the UL grant to the terminal based on the channel condition informed by the terminal.

In another embodiment, if the base station wants to support this non-RRC Connection based data transmission method, it can configure some conditions to the terminal and the terminal can intends to transmit the data without RRC Connection (Re-) establishment. The conditions can be a combination of at least one of the following:

The traffic data package from the application layer which need to be transmitted is bigger than zero;

The size of data available for transmission in the terminal is smaller than a threshold;

The channel condition is better than a threshold;

The delay requirement is less than a threshold;

The expected data-arrival interval is larger than a threshold.

Alternatively, the above rules can be pre-defined in the specification.

In this embodiment, the size of data available for transmission at least comprises the terminal identification information, the routing information in the core network and traffic data package from the application layer. The terminal identification information may be the terminal identification or the information for distinguishing from other terminals. The routing information is for the core network routing the traffic data package to the proper server through a serving gateway.

In another embodiment, a combination of at least one of the above conditions can be configured to the terminal, if the base station can support some terminals which have special requirements or in some special conditions, such as the terminals being in extreme channel conditions or having special delay requirements. In other words, only terminals which meet the conditions can use the other special resource pool(s). Specifically, for example, in the case of the RRC connection, the base station can combine one or several above conditions to configure the terminal. Then, in the case of meeting one of the above conditions, the terminal can utilize other specific resources.

In order for the base station to efficiently schedule the terminals and allocate resources, the resources (the preamble sequences, or the composite time-frequency regions, or the combinations of the preamble sequences and the composite time-frequency regions) in the specific resource pools may be divided into groups. Each group indicates a size level of data available for transmission. The resource group in the specific resource pools can be configured by the base station. Alternatively, it can be pre-defined in the specification.

An additional mapping rule may be configured by the base station. The additional mapping rule indicates how each resource group in the specific resource pools is corresponding to a size level of data available for transmission. In another embodiment, the additional mapping rule indicates how each resource group in the specific resource pools is corresponding to the channel condition level. Alternatively, this mapping rule may be pre-defined in the specification.

The terminal receives the system information from the base station, and obtains configurations from the base station or some pre-defined rules in the specification. The terminal determines whether there is/are specific resource pool(s) or not. If there is/are specific resource pool(s), the terminal obtains the conditions to use the specific resource pool(s). Based on the obtained conditions, the terminal may determine if it meets all the conditions. For example, the terminal may calculate the size of data available for transmission, measure the channel condition or/and estimate the data-arrival interval and so on. If the terminal meets all the conditions, it can use the resource in the specific resource pool(s).

The terminal calculates the size value of data available for transmission, matches the calculated value to a size level based on a pre-defined rule, and selects one of the corresponding specific resource pools according to the matched size level. The one of the corresponding specific resource pools indicates the size level of data available for transmission. The terminal can select a preamble sequence and/or a time-frequency region. Then, the terminal transmits the selected preamble sequence over the selected time-frequency region.

In another embodiment, the terminal can learn downlink channel conditions by receiving PSS/SSS downlink broadcasting channels (e.g., PBCH or PDCCH or PDSCH convey SIB) and/or other physical channels/signals or measurement (e.g., Reference Signal Received Power (RSRP)). Based on the downlink channel conditions, the terminal matches the channel condition (path-loss/coverage condition) to a size level based on a pre-defined rule, and selects a preamble sequence and a time-frequency region from a group of the special resource pool. The group indicates the channel condition (path-loss/coverage condition) based on the additional mapping rule. Then the terminal transmits the selected preamble sequence over the selected time-frequency region.

Alternatively, if the terminal does not meet the conditions of non-RRC connection establishment (re-establishment) to transmit data, the terminal will fall back to establish an RRC connection and use the resource pools to perform a random access procedure for the RRC connection.

The base station receives a random access preamble sequence over a time-frequency region and determines if the preamble and/or the time-frequency region is/are in the configured or pre-defined special resource pool. If the preamble and/or the time-frequency region is/are in the special resource pool, the base station can detect or know that this terminal intends to transmit traffic data without RRC Connection (Re-) establishment. In another embodiment, this terminal intends to inform the base station of its channel condition (path-loss/coverage condition). The base station also may obtain the size level of the data available for transmission of the terminal by the preamble sequence and/or the time-frequency region based on the configured or pre-defined mapping rule, such as the size level of the data available for transmission of the terminal or the channel condition (path-loss/coverage condition). With the information of the size level, the base station can allocate an uplink (UL) grant to the terminal based on this size level within the random access response to the terminal. In one embodiment, this size level can be the size level of the data available for transmission of the terminal.

Alternatively, the base station may reply a random access response with a UL grant which is smaller than the size of data available for transmission decoded from the selected preamble sequence and/or time-frequency regions.

In another embodiment, the base station can use a proper downlink resource to transmit the allocated UL grant based on the size level. The size level indicates the channel condition (path-loss/coverage condition). The channel condition can be downlink channel condition, which can be estimated by the terminal when receiving PSS/SSS and/or other downlink channels/signals. With the downlink channel condition, the base station can trade off the reliability and overhead when the downlink channel is transmitted. On the other hand, the base station can estimate the uplink channel condition (path-loss/coverage condition) by receiving the random access preamble sequence over a time-frequency region transmitted by the terminal (e.g., assuming the terminal transmits at full power). Based on the estimation of the channel condition (path-loss/coverage condition) and the consideration of the robustness and also the system overhead, the base station can schedule a proper UL grant for the terminal to transmit UL data.

The terminal receives the Random Access Response transmitted from the base station. If the Random Access Response contains a random access preamble identifier corresponding to the transmitted random access preamble, the terminal determines whether the Transport Block (TB) size granted is equal to or larger than the size of data available for transmission. If the TB size granted is equal to or larger than the size of data available for transmission, the terminal may transmit all the data available for transmission to the base station. The data available for transmission at least comprises the terminal identification information, the routing information in the core network and the traffic data package from application layer.

In LTE/LTE-A system, the terminal may transmit several MAC Service Data Units (SDUs) in a MAC Package Data Unit (PDU) which contains all the data available for transmission. The terminal stores the MAC PDU in the Msg3 buffer, and transmits the Msg3 in the allocated UL resource.

Figures 1, 4B:
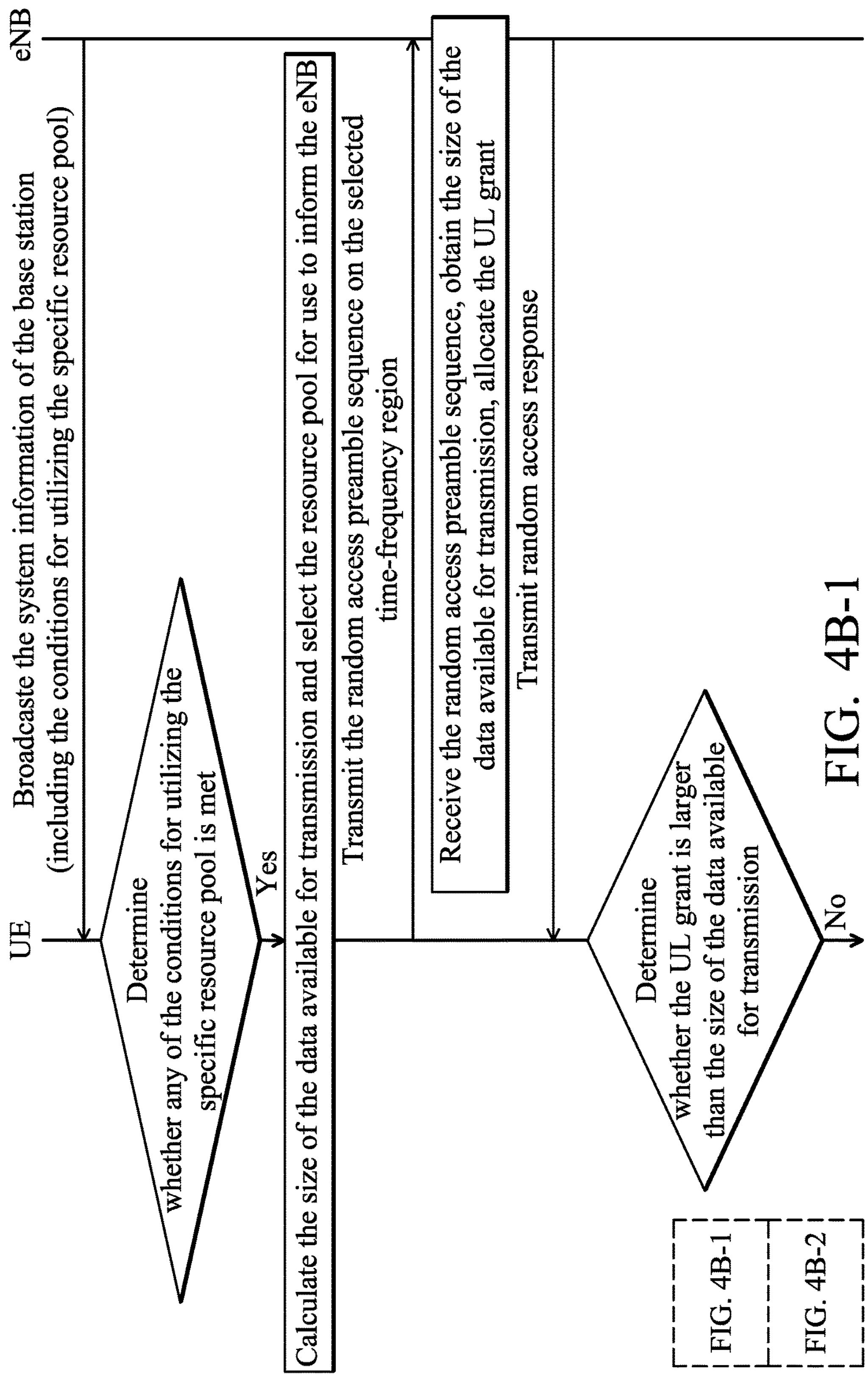
Figures 2, 4B:
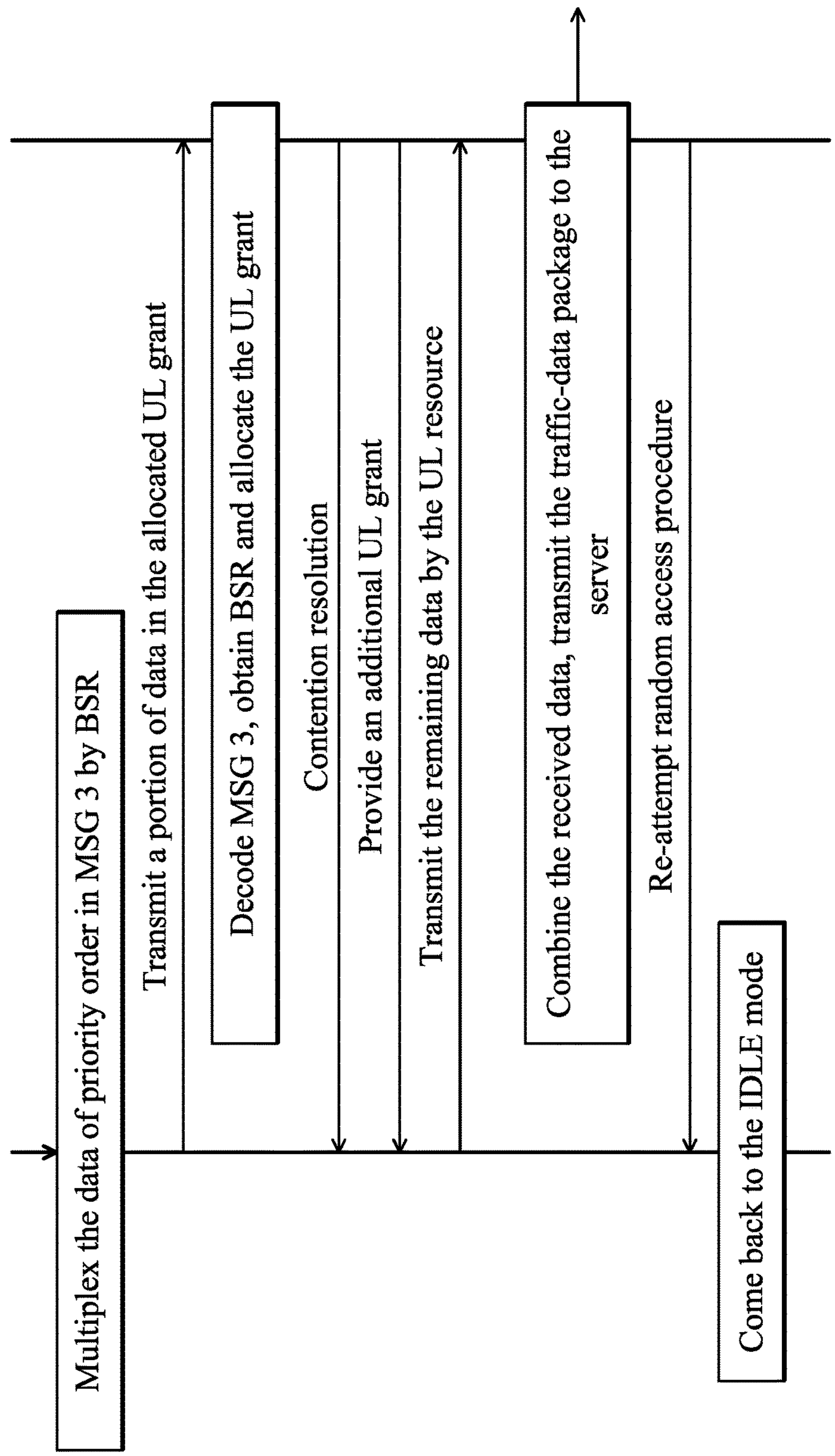

If the size of the granted TB is smaller than the size of available data to transmit, the terminal may re-attempt the random access procedure. Alternatively, if the size of the granted TB is larger than the size of available data to transmit, the terminal may assume the base station cannot support non-RRC Connection based data transmission and fall back to the random access procedure for RRC Connection (Re-)establishment. Alternatively, as shown in FIG. 4B, if the size of the granted TB is smaller than the size of available data to transmit, a Buffer Status Report (BSR) may be triggered; the terminal multiplexes or transmits the terminal identification information, the routing information in the core network, BSR MAC Control Element and traffic data package from application layer in a MAC PDU with a strict decreasing priority order until the UL grant is exhausted. The terminal stores the MAC PDU in Msg3 and transmits the Msg3 in the allocated UL resource.

The base station receives and decodes the data transmitted from a terminal. If the base station schedules a UL grant based on the size level of data available for transmission indicated from the terminal or the BSR in the data from the terminal indicates that the buffer size is equal to zero, the base station may assume the entire traffic data package has been transmitted completely. The base station may transmit a contention resolution message to the terminal and transfer the traffic data package to the proper server through a serving gateway.

Figures 1, 4C:
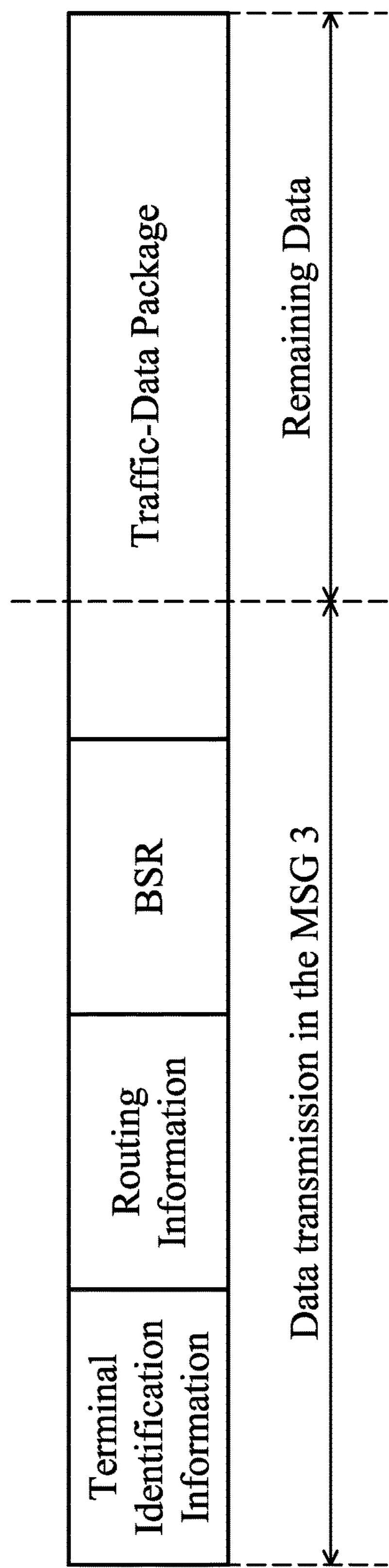

Alternatively, if the base station does not schedule enough UL granted for the terminal in the random access response or a non-zero BSR is triggered and transmitted in Msg3, the base station may grant an additional UL resource to the terminal for transmitting the remaining data after resolving the contention resolution for the terminal. As shown in FIG. 4C, the remaining data can be the rest of the data when the UL grant is exhausted for a MAC PDU with a strict decreasing priority order of the terminal identification information, the routing information in the core network, the BSR MAC control element and the traffic data package from the application layer.

Figures 1, 4D:
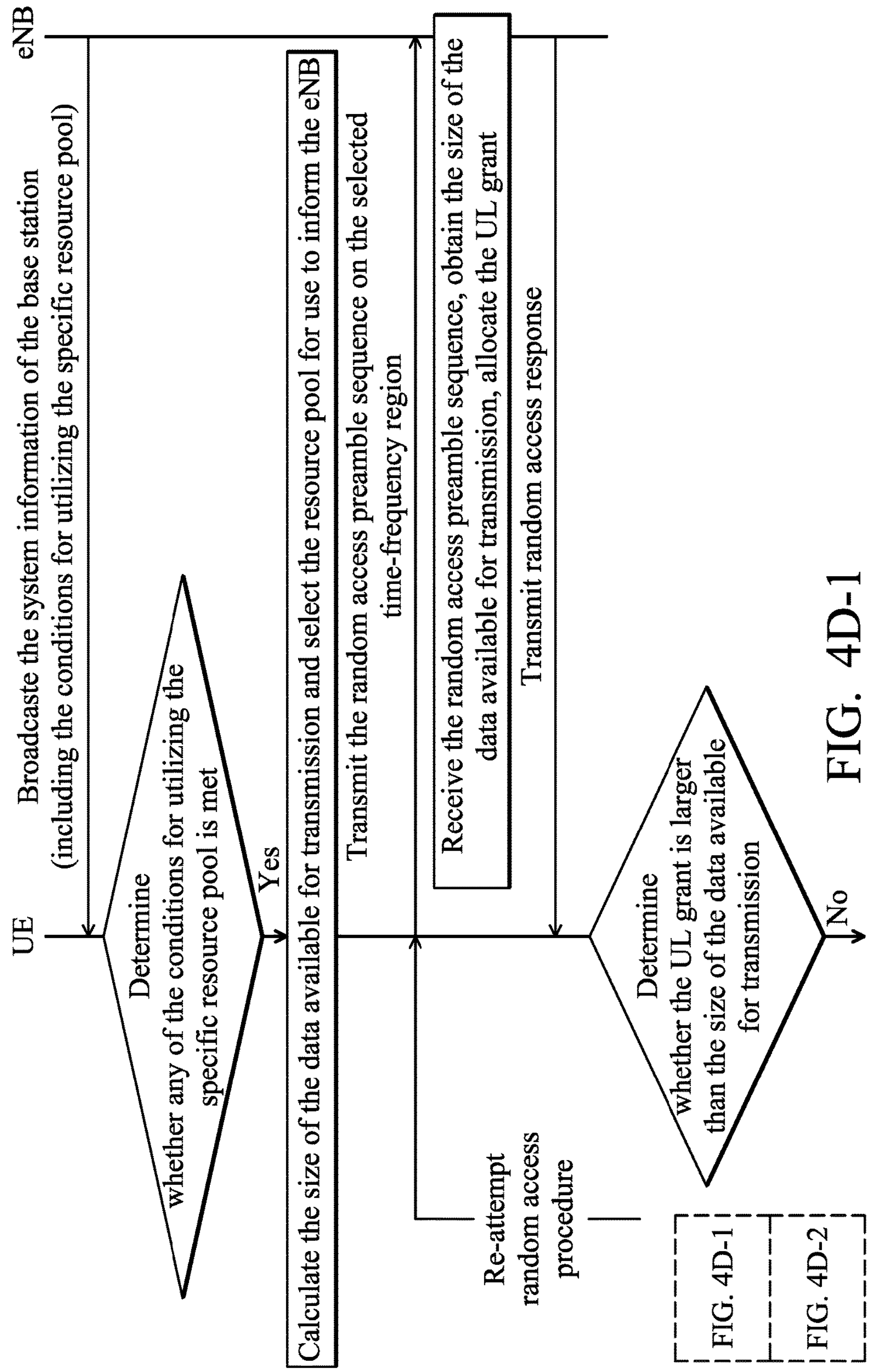
Figures 2, 4D:
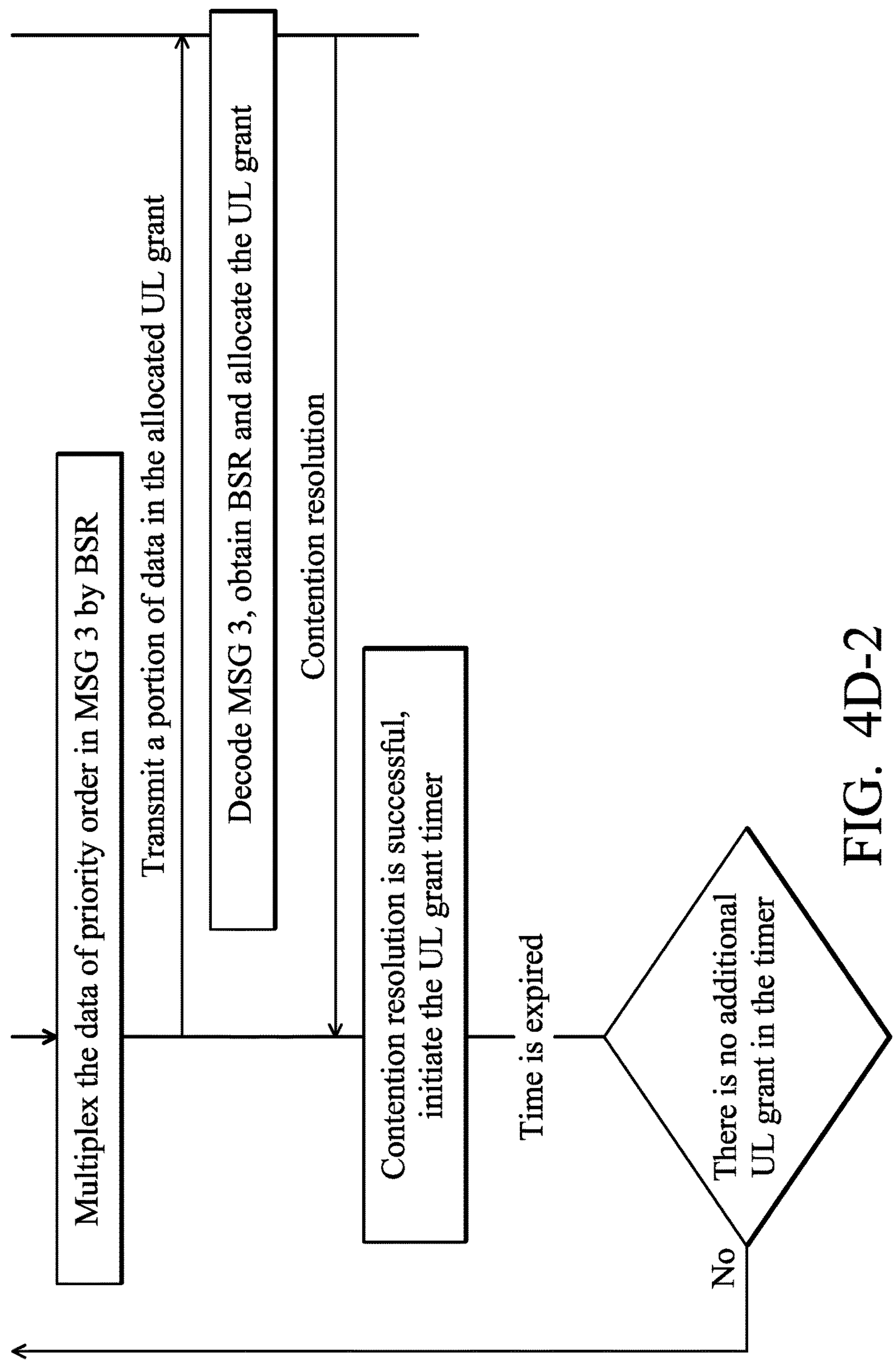

After the terminal finishes the contention resolution, if the terminal has transmitted the entire traffic data package, the terminal assumes all the data has been successfully decoded and turns back to the IDLE mode. Alternatively, as shown in FIG. 4D, after the terminal finishes the contention resolution, if the terminal receives an additional UL grant within an additional UL grant timer, the terminal transmits the remaining data with the UL resource. Alternatively, if there is remaining data in the terminal but there is no additional UL grant received from the based station within an additional UL grant timer, the terminal may re-attempt the random access procedure.

If the base station transmits an additional UL resource to the terminal, the base station receives the remaining data with the scheduled UL resource. After successfully decoding the data, the base station may transmit an Ack message to the terminal, combines the remaining data with the transmitted data which was previously received, and transfers the traffic data package to the proper server through a serving gateway.

Some of the typical traffic in the network is characterized by small packages in downlink and uplink. Certain applications are, in addition, characterized by heavy access load in uplink. For example, the MTC traffic mode has been given in the standard of 3GPP TR 36.888. The UL regular package size for low cost MTC is 1000 bits with seconds or minutes level of the UL interval. In the standard of RP-121282, Vodafone Group showed the type of traffic for which smart meters use very low data rates with small packages and relaxed latency requirements, e.g. package size on the order of 100 bytes/message in UL and 20 bytes/message in DL. In these cases, the package size is comparable to the signaling overhead, for example, the signaling overhead for RRC connection (Re-)establishment. On the other hand, the time for setting up an RRC connection may be longer than the time needed for package transmission. This may degrade the performance of the entire network when a large number of terminals subscribe in the network. Therefore, an efficient method for data transmission is needed. Meanwhile, power consumption can be further reduced if the terminal can transmit the small data without sending or receiving a lot of control signaling.

The random access procedure is performed for RRC connection (Re-)establishment procedure, a handover, DL or UL data arrival during RRC_CONNECTION. The random access is a necessary procedure for all the terminals for initial connection and data transmission. In order to transmit data with a high efficiency, the data can be transmitted without establishing RRC connection. However, in order to transmit data more efficiently, the method to report the size of data available for transmission by the terminal to the base station is the first step. And the method for the base station to allocate a proper UL grant to the terminal also needs to be solved. Another key problem is how to transmit the data by the terminal within random access procedure without establishing RRC connection. Moreover, a complete fall-back mechanism is necessary to ensure the data transmission. For example, what the terminal should do if the base station does not allocate a large enough UL resource at the beginning and what the base station shall reply if the terminal further requests a UL grant.

In one embodiment of the present invention, the base station may broadcast system information (SI) that includes configuration about random access and other channel information to the terminals. In the configurations, there may be several separate resource pools, which may be separated through different preamble sequences sets, or through different composite time-frequency region sets, or through different combinations of preamble sequences and composite time-frequency regions. Some resource pools (non-specific resource pools) are for the terminal to perform a random access procedure for RRC connection (Re-) establishment and the other specific resource pool(s) is/are for the terminal to perform a random access procedure and transmit data without the RRC connection. Furthermore, in order to efficiently schedule the terminals and allocate resource by the base station, the resources (the preamble sequences or the composite time-frequency regions or the combinations of preamble sequences and composite time-frequency regions) in the specific resource pools may be divided into groups and each group indicates a size level of data available for transmission. The resource group in the specific resource pools can be configured by the base station. Alternatively, it can be pre-defined in the specification.

An additional mapping rule is configured by the base station. The additional mapping rule is utilized to indicate how each resource group in the specific resource pools corresponds to a size level of data available for transmission. Alternatively, this mapping rule may be pre-defined in the specification.

Figure 5:
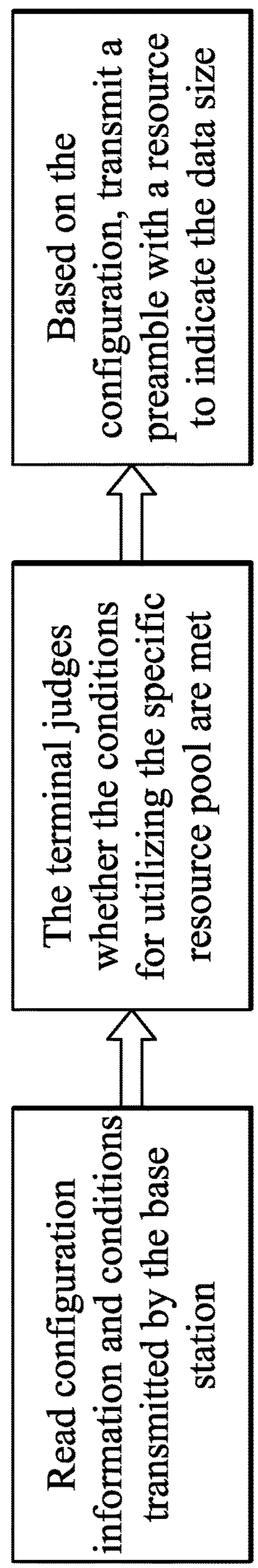
FIG. 5 illustrates an example of random access resource selection equipment in the terminal for non-RRC connection-based data transmission in accordance with the embodiments of the present invention.

In one embodiment of the present invention, a method for efficient data transmission is provided, as shown in FIG. 5. FIG. 5 is an example of random access resource selection equipment in the terminal for non-RRC connection-based data transmission according to an embodiment of the present invention. A base station broadcasts the configurations and the conditions of data transmission to the terminals, receives the preamble sequence, and then obtains the size level. Finally, if the terminal is attempting non-RRC connection-based data transmission, the base station allocates an uplink grant based on the size level.

Figure 6:
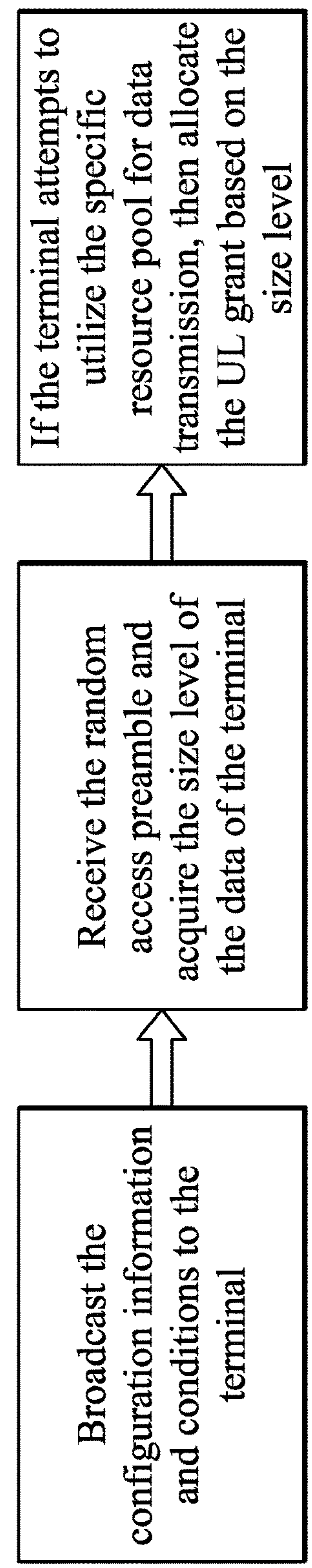
FIG. 6 illustrates an example of configuration equipment in the base station for non-RRC Connection based data transmission in accordance with the embodiments of the present invention.

Corresponding to FIG. 5, FIG. 6 gives an example of the configuration of the base station for non-RRC connection-based data transmission. First, a terminal reads the configurations and conditions from the base station and determines whether it meets all the conditions for non-RRC connection-based data transmission. Based on the configuration, the terminal transmits a preamble resource to the base station for indicating the needed resource size. Specifically, the terminal receives the system information from the base station, and obtains configurations from the base station or some pre-defined rules in the specification. The terminal determines whether there is/are specific resource pool(s) or not. If there is/are specific resource pool(s), the terminal obtains the conditions to use the specific resource pool(s).

Based on FIG. 5 and FIG. 6, details of the embodiments are given below. The base station configures two separate resource pools, one is for the normal random access procedure for RRC Connection (Re-)establishment and the other specific resource pools is for non-RRC connection based data transmission. For example, the preamble rootSequenceIndex for normal random access procedure and the specific resource are set to 0 and 500 respectively, but both resource pools share the same prach-ConfigInfo 20 of the time-frequency region. Alternatively, the prach-ConfigInfo of the time-frequency region can be set to 0 and 20 respectively for the normal resource pool and the specific resource pool with the same rootSequenceIndex 0. Alternatively, the preamble rootSequenceIndex in normal and specific resource pool are set to 0 and 500 respectively, and the prach-ConfigInfo are set to 0 and 20 respectively. Alternatively, another separating preamble resource method is normal and specific resource pools share the same rootSequenceIndex. However, the normal resource pool is the first 32 sequences, and the specific resource pool are the following 64 sequences as another example.

The conditions for non-RRC connection based data transmission are configured by the base station or pre-defined. If the following condition is met, the terminal can attempt non-RRC (Re-)establishment data transmission. The conditions can be one or a combination of the following:

The traffic data package from application layer which needs to be transmitted is bigger than zero;

The size of data available for transmission in the terminal is small than 125 bytes;

The channel condition is better than a threshold, such as the path loss is smaller than Pmax;

The expected data-arrival interval is large than a threshold, such as 320 ms.

In one embodiment of the present invention, the specific resource pool is divided into 12 groups. Table 1 gives an example of the mapping rule of how each group mapping to a size level. The rootSequenceIndex in the specific resource pool is 500, and the number of preamble sequence in the specific resource pool is 64. The preamble sequences are divided into 4 group and each group has 64/4=16 sequences. Preamble Group N is generally composed of the $(N+1)^{th}$~$16\times(N\pm1)^{th}$ sequences started from rootSequenceIndex 500. Table 2 presents the buffer size levels with the maximum buffer size supported 125 bytes.

TABLE 1

Mapping rule of resource group in the specific resource to data size level (Taking FDD PRACH Configuration Index 10 Subframe {2, 5, 8} with 4 preamble Groups as an example)

| | Preamble Group 0 | Preamble Group 1 | Preamble Group 2 | Preamble Group 3 |
|---|---|---|---|---|
| Subframe 2 | 0 | 3 | 6 | 9 |
| Subframe 5 | 1 | 4 | 7 | 10 |
| Subframe 8 | 2 | 5 | 8 | 11 |

TABLE 2

Data buffer size levels

| Index | Buffer Size (BS) value [bytes] |
|---|---|
| 0 | BS = 0 |
| 1 | 0 < BS <= 10 |
| 2 | 10 < BS <= 14 |
| 3 | 14 < BS <= 17 |
| 4 | 17 < BS <= 21 |
| 5 | 21 < BS <= 28 |
| 6 | 28 < BS <= 37 |
| 7 | 37 < BS <= 50 |
| 8 | 50 < BS <= 64 |
| 9 | 64 < BS <= 96 |
| 10 | 96 < BS <= 125 |
| 11 | BS > 125 |

In another embodiment, the number of groups in the special resource pool is configured by the base station. One or multiple rootSequenceIndex and/or one or multiple prach-ConfigInfo are configured in the special resource pool. In one embodiment, the one or multiple rootSequenceIndex and/or prach-ConfigInfo are mapped to a size level based on a rule of how each group is mapped to a size level. In another example, the physical resource in one prach-ConfigInfo can be further divided into several groups. And each group consociated with the same or different rootSequenceIndex is mapped to a size level. An example of PRACH-Config information elements is given below. PRACH-ConfigSpecial is configured in the PRACH-Config IE, which conveys RootSequenceGroupNum and prach-ConfigInfoNum followed by one or more configurations of rootSequenceIndex and prach-ConfigInfo.

The following example is an embodiment according to the present invention about the illustrative elements of PRACH-Config PRACH-Config Information Elements

```
-- ASN1START
PRACH-ConfigSIB ::=           SEQUENCE {
rootSequenceIndex               INTEGER (0..837),
prach-ConfigInfo                PRACH-ConfigInfo
}
PRACH-Config ::=                SEQUENCE {
rootSequenceIndex               INTEGER (0..837),
prach-ConfigInfo              PRACH-ConfigInfo       OPTIONAL      -- Need ON
}
PRACH-ConfigSCell-r10 ::=       SEQUENCE {
prach-ConfigIndex-r10           INTEGER (0..63)
}
PRACH-ConfigSpecial ::=         SEQUENCE {
RootSequenceGroupNum            INTEGER (0..16),
OPTIONAL       -- Need ON
rootSequenceIndex-0             INTEGER (0..837),      OPTIONAL      -- Need ON
rootSequenceIndex-1             INTEGER (0..837),      OPTIONAL      -- Need ON
```

-continued

```
......
prach-ConfigInfoNum          INTEGER (0..16),     OPTIONAL    -- Need ON
prach-ConfigInfo-0           PRACH-ConfigInfo     OPTIONAL    -- Need ON
prach-ConfigInfo-1           PRACH-ConfigInfo     OPTIONAL    -- Need ON
......
}
PRACH-ConfigInfo ::=         SEQUENCE {
prach-ConfigIndex            INTEGER (0..63),
highSpeedFlag                BOOLEAN,
zeroCorrelationZoneConfig    INTEGER (0..15),
prach-FreqOffset             INTEGER (0..94)
-- ASN1STOP
```

The terminal receives system information from the base station and obtains configurations from the base station or some pre-defined rules in the specification. The terminal determines whether there is/are special resource pool(s) or not. If there is/are special resource pool(s), the terminal obtains the conditions to use the special resource pool(s). Based on the obtained conditions, the terminal may determine if it meets all the conditions. For example, the terminal may calculate the size of data available for transmission, measure the channel condition or/and estimate the data-arrival interval and so on. If the terminal meets any one of the all the conditions, it can use the resource in the special resource pool(s). In one embodiment of the present invention, the terminal calculates the data available for transmission which includes the terminal identity information (e.g. the terminal ID or other information which can differentiate the terminal from other terminals), the routing information in the core network (e.g., NAS information for packet routing) and the traffic data packet from the application layer. It should be understood that the terminal identity information can be terminal ID or other information for distinguishing it from other terminals. The routing information is for the core network to route the traffic data packet to the proper server through a serving gateway. The terminal can measure the channel condition or/and estimate the data-arrival interval. For example, the data available for transmission is equal to 15 bytes smaller than the threshold of 125 bytes, or the path-loss is smaller than Pmax, or the next data packet is expected to arrive in 400 ms. The terminal can use the special resource for non-RRC connection (Re-)establishment procedure and perform a random access procedure as do other terminals.

If the terminal meets one or several of the conditions for non-RRC Connection data transmission, the terminal can transmit data without establishing a RACH procedure for an RRC Connection establishment. The terminal calculates the size value of data available for transmission, and matches the calculated value to a size level based on a pre-defined rule. The terminal selects a preamble sequence and a time-frequency region from a group of the special resource pool. The group indicates the size level of data available for transmission based on the additional mapping rule. Then the terminal transmits the selected preamble sequence over the selected time-frequency region. For example, the terminal calculates the size of data available for transmission equal to 15 bytes, and finds out the buffer size falls into index 3 according to Table 2. According to Table 1, the preamble sequence is selected from Preamble Group 1 and transmitted at the subframe 2.

Alternatively, if the terminal does not meet anyone of the conditions, or there is no traffic data packet from application layer available for transmission, the terminal will fall back to establish RRC connection. For example, the calculated size is equal to 127 bytes which is larger than the threshold of 125 bytes; or the path loss is larger than Pmax; or the next data packet is expected to arrive in 100 ms. The terminal may use the resource pools to perform a random access procedure for RRC connection (Re-)establishment procedure and perform the random access procedure as for other terminals.

The base station receives a random access preamble sequence over a time-frequency region and determines if the preamble and/or the time-frequency region is/are in the configured or pre-defined special resource pool. If it is in the special resource pool, the base station can know or detect that this terminal intends to transmit traffic data without RRC Connection (Re-)establishment. The base station also may obtain the size level of the data available for transmission of the terminal by the preamble sequence and/or the time-frequency region based on the configured or pre-defined mapping rule. With the knowledge or information of the size level, the base station can allocate an uplink (UL) grant to the terminal based on this size level within the Random Access Response to the terminal. In one embodiment of the present invention, the base station receives the preamble sequence transmitted by the terminal at the subframe 2. Since the preamble sequence is selected from the preamble group 1 and transmitted at the subframe 2, according the mapping rule Table 1, it indicates the data buffer size level is index 3. As a result, the base station acquires the data buffer size level is 14<BS<=17 [bytes] according to Table 2. Therefore, the base station allocates a UL Grant for buffer size value equal to 18 bytes, which is larger than 17 bytes requested by the terminal. A MAC Random Access Response with the UL grant for buffer size value equal to 18 bytes is multiplexed into a MAC PDU and transmitted to the terminal by the base station, which may also include R/Timing Advance Command/Temporary C-RNTI as shown in FIG. 2.

The terminal receives the random access response transmitted from the base station which corresponds to its transmitted preamble sequence. The terminal compares whether the granted Transport Block (TB) size can accommodate all of the data available for transmission. For example, if the UL resource is larger than 15 bytes which is the size of data available for transmission, the terminal may transmit all the data available to the base station. In the LTE system, the terminal multiplexes MAC Service Data Units (SDUs) in a MAC Packet Data Unit (PDU) which contains all the data available for transmission, stores the MAC PDU in the Msg3 buffer, and transmits the Msg3 in the allocated UL resource.

The base station receives and decodes the data transmitted from the terminal. Since base station schedules the UL grant based on the size level of data available for transmission, the base station assumes the entire traffic data packet has been transmitted completely. Then, the base station transmits a contention resolution message to the terminal and transfers the traffic data packet to the core network and to the proper server through a serving gateway.

Alternatively, the base station may reply a random access response with a UL grant which is smaller than the size of data available for transmission. The UL grant is decoded from the selected preamble sequence and/or the time-frequency regions. For example, when the base station receives a request indicating that the data size belongs to 14<BS<=17 bytes, the base station may reply with a UL grant for the TB size which is equal to 10 bytes.

Correspondingly, when the terminal decodes the random access response and obtains a TB size granted smaller than the size of available data for transmission, the terminal may select the resource again from the specific resource pool and re-attempt the random access procedure. For example, the terminal decodes the random access response and obtains a UL grant with the TB size which is equal to 10 bytes which is smaller than the size of data available for transmission of 15 bytes, therefore, the terminal re-selects a resource from the special resource group and re-attempt the random access procedure.

Alternatively, when the terminal finds the size of the granted TB is 10 bytes, which is smaller than its size of data available for transmission of 15 bytes, the terminal may assume the base station cannot support non-RRC Connection based data transmission and fall back to transmit Msg 3 as the random access procedure for RRC Connection (Re-)establishment.

Alternatively, when the terminal finds the granted TB size is 10 bytes which is smaller than its size of data available for transmission. The terminal multiplexes 10 bytes data. Specifically, the terminal multiplexes the terminal identification information, the routing information in the core network, BSR MAC Control Element and traffic data package from application layer with a strict decreasing priority order until the UL grant is exhausted. The BSR indicates the remaining 6 bytes (1 byte is used for reporting the BSR), and the terminal stores the MAC PDU in Msg3 and transmits the Msg3 in the allocated UL resource.

If the base station schedules a UL grant that is smaller than the request, the base station grants an additional UL grant to the terminal for the remaining data after the contention is resolved. The allocation of the additional UL grant may be based on the received BSR from the terminal. For example, if the base station schedules a UL grant for the TB size which equals to 10 bytes to the terminal, while the request of the terminal is 14<BS<=17 bytes. Therefore, the scheduled UL grant by the base station is smaller than the request, and the base station may grant an additional UL resource. The allocation of the additional UL grant may be based on the received BSR from the terminal. For example, if the terminal reports a 6 bytes BSR through the Msg 3, then the base station decodes Msg 3 and grants an additional UL grant with 6 bytes TBS to the terminal according to the data size indicated by the BSR of the Msg 3.

After the terminal successfully finishes the contention resolution, it can be assumed that all the data has been successfully decoded by the terminal. If the terminal has transmitted the entire data packet, then the terminal assumes all the data has been successful decoded and turns back to IDLE mode. Alternatively, after the terminal successfully finishes the contention resolution, if the terminal receives an additional UL grant within an additional UL grant timer, the terminal transmits the remaining data (e.g., 6 bytes remaining data) with the UL resource. Alternatively, if the terminal has the remaining data and does not receive an additional UL grant within an additional UL grant Timer, the terminal may re-attempt the random access procedure.

The base station may receive the remaining data with the scheduled UL resource after it transmits an additional UL grant. After successfully decoding the data, the base station may transmit an acknowledgment (Ack) message to the terminal, combine the remaining data with the transmitted data which was previously received, and transfer the traffic data packet to the proper server through a serving gateway.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An user equipment, comprising:

a RF transceiver that receives broadcast information from a base station, wherein the broadcast information comprises at least one specific resource pool and at least one non-specific resource pool for a random access preamble, wherein the RF transceiver is further configured to receive a random access response (RAR) from the base station, wherein the RAR comprises an allocated uplink (UL) resource; and a processor that utilizes the at least one specific resource pool to perform a random access (RA) procedure of data transmission when the user equipment meets at least one condition, and generates a media access control (MAC) package data unit (PDU) in message 3 (MSG 3) in the allocated UL resource, wherein the MAC PDU comprises data available for transmission from an application layer;

the RF transceiver transmits the MAC PDU in MSG 3 in the allocated UL resource to the base station.

2. The user equipment of claim 1, wherein the at least one specific resource pool and the at least one non-specific resource pool are classified by at least one of the classification: different sets of preamble sequences, or by different sets of composite time-frequency regions, or by different sets of preamble sequences and composite time-frequency regions.

3. The user equipment of claim 1, wherein the at least one specific resource pool is utilized for the random access procedure of non-radio resource control (RRC) connection to transmit traffic data, and the at least one non-specific resource pool is utilized for the user equipment to perform the random access procedure for RRC connection (re-) establishment procedure.

4. The user equipment of claim 1, wherein the at least one condition comprises at least one of the following conditions:

a traffic data package from the application layer is bigger than zero;

a size of the data available for transmission in the user equipment is small than a threshold;

a channel condition is better than a threshold;

a delay requirement is less than a threshold; and an expected data-arrival interval is large than a threshold.

5. The user equipment of claim 4, wherein the data available for transmission comprises at least one of the followings: terminal identification information, routing information in a core network and the traffic data package from the application layer.

6. An apparatus, comprising:

a RF transceiver that receives broadcast information from a base station, wherein the broadcast information comprises at least one specific resource pool and at least one non-specific resource pool, and the at least one specific resource pool comprises at least one resource group;

a processor that selects a preamble sequence and a time frequency region, wherein the at least one of the preamble sequence and the time-frequency region is selected from the at least one resource group in the specific resource pool;

the RF transceiver transmitting a preamble sequence to the base station over a time-frequency region; and receiving random access response (RAR) from the base station, wherein the RAR comprises allocated uplink (UL) resource; and transmits a media access control (MAC) package data unit (PDU) in message 3 (MSG 3) in the allocated UL resource, wherein the MAC PDU comprises data available for transmission from an application layer to the base station.

7. The apparatus of claim 6 wherein the processor determines whether a condition for utilizing the specific resource pool is met before transmitting the preamble sequence to the base station over the time-frequency region.

8. The apparatus of claim 7, wherein the condition comprises at least one of the following conditions:

a traffic data package from the application layer is bigger than zero;

a size of the data available for transmission in the apparatus is small than a threshold;

a channel condition is better than a threshold;

a delay requirement is less than a threshold; and an expected data-arrival interval is large than a threshold.

9. The apparatus of claim 6, wherein before transmitting the preamble sequence by the RF receiver to the base station over the time-frequency region, the processer is configured to calculate a size of the data available for transmission by the processor;

match the calculated size to a size level; and select the resource group from the specific resource pool according to a pre-defined mapping rule, wherein the resource group is corresponding to the size level.

10. The apparatus of claim 6, wherein before transmitting the preamble sequence to the base station over the time-frequency region, the processer is further configured to calculate a channel condition;

compare the channel condition to a threshold; and select the resource group from the specific resource pool according to the channel condition and a pre-defined mapping rule.

11. The apparatus of claim 9, wherein that the data available for transmission comprises at least one of the followings: terminal identification information, routing information in a core network and the traffic data package from the application layer.

12. The apparatus of claim 6, further comprising: after transmitting the preamble sequence over the time-frequency region to the base station, the processer acquires a uplink (UL) grant in the RAR; and determines whether a size of a granted transmission block (TB) is equal to or larger than a size of the available data for transmission.

13. The apparatus of claim 12, wherein the UL grant in the RAR grants the base station to receive the preamble sequence through the time-frequency region, and determines the size of the data available for transmission for the UL grant according to the time-frequency region and the data level corresponding to the resource group where the preamble sequence belongs to.

14. The apparatus of claim 12, wherein determining whether the size of the granted transmission block (TB) is equal to or larger than the size of the available data for transmission by the processer further comprising:

when the size of the granted TB is equal to or larger than the size of available data to transmit, the apparatus transmits all the data available for transmission in the allocated UL resource.

15. The apparatus of claim 12, wherein determining whether the size of the granted transmission block (TB) is equal to or larger than the size of the available data for transmission by the processer further comprising:

when the size of the granted TB is equal to larger than the size of data available for transmission, multiplexing MAC Service Data Units (SDUs) which contain all the data available for transmission in the MAC PDU, storing the MAC PDU in a Msg 3 buffer by the processor, and transmitting the Msg 3 in the allocated UL resource by the RF transceiver.

16. The apparatus of claim 12, wherein determining whether the size of the granted transmission block (TB) is equal to or larger than the size of the available data for transmission by the processor further comprising re-attempting the random access procedure by the apparatus when the size of the granted TB is smaller than the size of data available for transmission.

17. The apparatus of claim 12, wherein determining whether the size of the granted transmission block (TB) is equal to or larger than the size of the available data for transmission by the processer further comprising when the size of the granted TB is smaller than the size of data available for transmission, triggering a Buffer Status Report (BSR) with a decreasing priority order until the UL grant is exhausted, storing the MAC PDU in the Msg 3 by the processor and transmitting the Msg 3 in the allocated UL resource to the base station by the RF transceiver.

18. The apparatus of claim 17, wherein the available data for transmission comprises terminal identification information, routing information in the core network, a BSR MAC Control Element and the traffic data package from the application layer.

19. The apparatus of claim 17, further comprising:

storing the MAC PDU in the Msg 3 by the processor;

receiving and decoding a contention resolution, after transmitting the Msg 3 in the allocated UL resource to the base station by the processor; and receiving an additional UL grant from the base station by the processor;

transmitting remaining data on the additional UL resource by the RF transceiver indicated by the additional UL grant, wherein the remaining data is subtracting the transmitted data when the UL grant is exhausted from the size level of the data of the granted transmission region.

* * * * *